(12) United States Patent
Hirtenlehner

(10) Patent No.: US 7,793,596 B2
(45) Date of Patent: Sep. 14, 2010

(54) RETRACTABLE STEP

(75) Inventor: Andreas Hirtenlehner, Waidhofen an der Ybbs (AT)

(73) Assignee: Knorr-Bremse Ges. M. B. H., Modling (AT)

( * ) Notice: Subject to any disclaimer, the term of this patent is extended or adjusted under 35 U.S.C. 154(b) by 447 days.

(21) Appl. No.: 10/572,263

(22) PCT Filed: Sep. 17, 2004

(86) PCT No.: PCT/EP2004/010426

§ 371 (c)(1),
(2), (4) Date: Jun. 30, 2008

(87) PCT Pub. No.: WO2005/030551

PCT Pub. Date: Apr. 7, 2005

(65) Prior Publication Data

US 2008/0250966 A1    Oct. 16, 2008

(30) Foreign Application Priority Data

Sep. 18, 2003    (AT) .............................. A 1474/2003

(51) Int. Cl.
*B61D 23/00* (2006.01)
*B61D 47/00* (2006.01)

(52) U.S. Cl. .................... 105/449; 105/443; 105/444

(58) Field of Classification Search ......... 105/443–445, 105/449
See application file for complete search history.

(56) References Cited

U.S. PATENT DOCUMENTS

| 3,957,284 | A | * | 5/1976 | Wright ....................... 280/166 |
| 4,381,899 | A | | 5/1983 | Merkle |
| 4,662,021 | A | | 5/1987 | Hagen et al. |
| 5,154,125 | A | | 10/1992 | Renner et al. |
| 5,636,399 | A | | 6/1997 | Tremblay et al. |
| 5,676,515 | A | | 10/1997 | Haustein |
| 5,775,232 | A | | 7/1998 | Golemis et al. |
| 7,516,703 | B2 | * | 4/2009 | Tazreiter ..................... 105/443 |

FOREIGN PATENT DOCUMENTS

| DE | 195 03 079 A1 | 8/1996 |
| EP | 0 217 265 A1 | 4/1987 |
| EP | 1 034 765 A2 | 9/2000 |
| JP | 2002-187547 | 7/2002 |

* cited by examiner

*Primary Examiner*—S. Joseph Morano
*Assistant Examiner*—Zachary Kuhfuss
(74) *Attorney, Agent, or Firm*—Barnes & Thornburg LLP

(57) ABSTRACT

A retractable step for a rail vehicle includes a treadable region having lateral guides, a front edge, a guide region, a first roller disposed on the rail vehicle, and a second roller disposed in a guide. The guide has a configuration that is one or more of oblique, curved or bent. Also included is a transition area between the treadable region and the guide region. The transition area is configured to have one or more of a bend and a curvature and has an upwardly convex shape.

19 Claims, 4 Drawing Sheets

RETRACTABLE STEP

BACKGROUND AND SUMMARY

The present disclosure relates to a movable footboard or retractable step, fitted to a rail vehicle.

In passenger cars of rail-bound vehicles, there is the problem that, under certain operating conditions, a gap exists between the bottommost fixed step of the vehicle and the end wall of the platform. The gap represents an obstacle and a danger for elderly and frail individuals, for children and dogs, but also for luggage and the like which has to be pulled along. Strongly differing geometric boundary conditions can exist at different railway stations, even those under the very same rail administration. In modern, generally air-sprung vehicles, a wide variety of car body positions can occur in relation to the rails, according to passenger numbers, passenger distribution and, where appropriate, occurring defects in the pneumatic suspension. Thus, it appears that there is no possibility of standardizing this gap at all the scheduled stops nor of making the gap, in practice, as small as might be wished.

There is, therefore, the need for a retractable step which at present, for reasons of space, can only be disposed on the underside of the car body. This means that the retractable step can only be used where it is situated above the top edge of the platform, since it otherwise strikes the end wall of the platform as it is extended, and, in most cases, is retracted again by an automatic collision recognition system. In order to cope with the increasing passenger numbers, particularly in short-distance traffic, there is now increasingly the tendency to use double-deck cars in which the underside of the car body is placed very low down in order, within the structure clearance, to provide sufficient height for the accommodation of two passenger decks. With these cars, or, indeed, with single-deck cars with a low-lying deck, it has previously not been possible to provide retractable steps of this type.

A further problem resides in the fact that obstacles in the region of the retractable steps, for example platforms of above-average height, equipment located next to the track, or waiting passengers, may lead to unfortunate, sometimes dangerous collisions. In connection with the extensible steps, there is therefore the need to monitor and, where necessary, halt the motional sequence during the extension.

The present disclosure relates to providing a retractable step which addresses the above requirements and is operative and usable even under the above usage conditions.

According to the present disclosure, a guide rail, at a platform-remote end of a retractable step runs obliquely or in a curve. In addition, the retractable step is of a curved or bent configuration. It is thereby possible to extend the platform-side edge of the retractable step in an obliquely upward-running direction, so that it even gets over platform top edges which are higher than the retractable step in its rest position. According to the present disclosure, a monitoring of the motional sequence of the retractable step is achieved by the fitting of sensors at certain places on the retractable step, on the guide, or in the drive unit of the retractable step.

Other aspects of the present disclosure will become apparent from the following descriptions when considered in conjunction with the accompanying drawings.

DETAILED DESCRIPTION OF THE DRAWINGS

Figure 1:
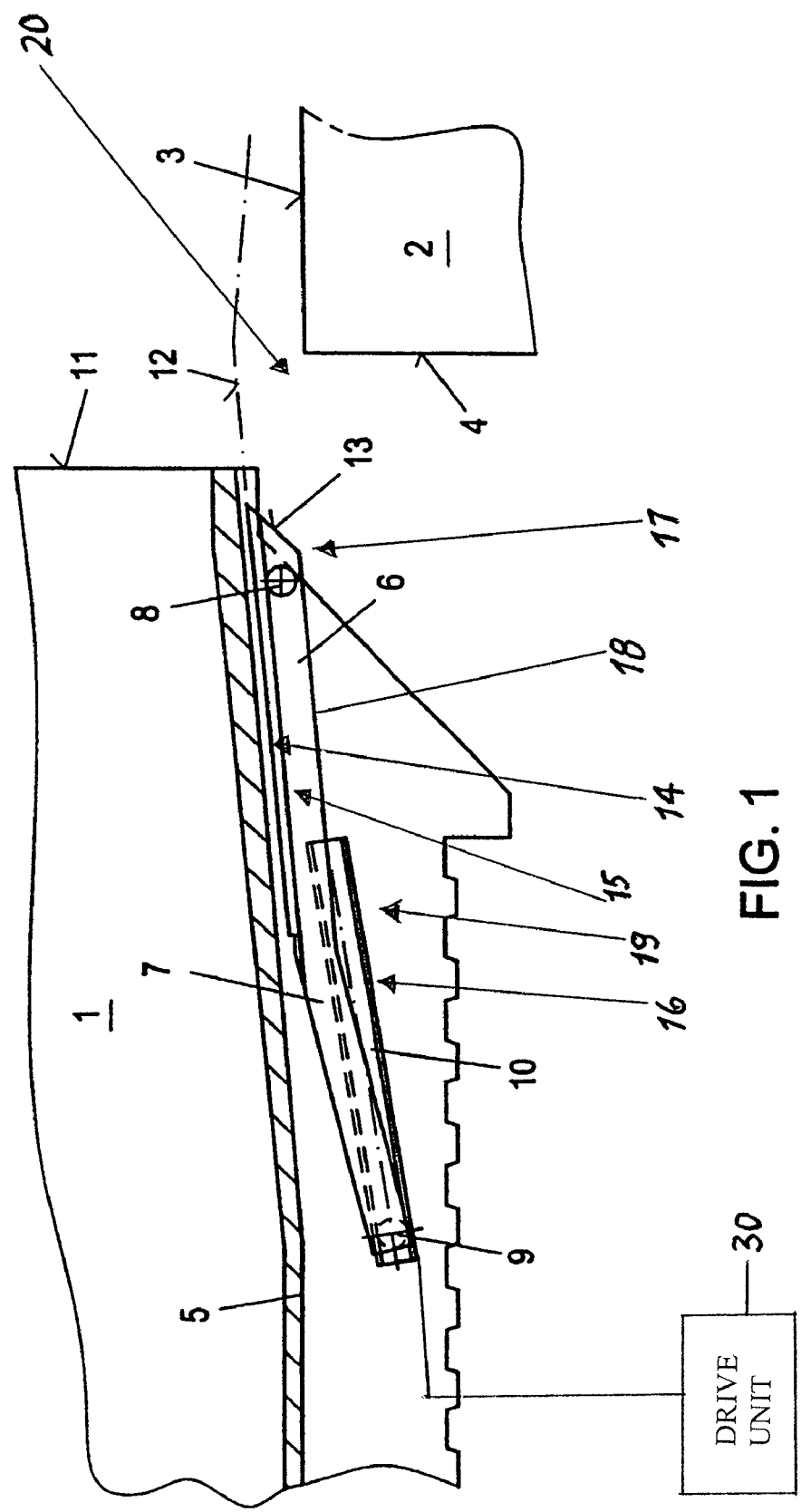
FIG. 1 is a side, partial sectional view of a retractable step in a rest position, according to the present disclosure.
Figure 2:
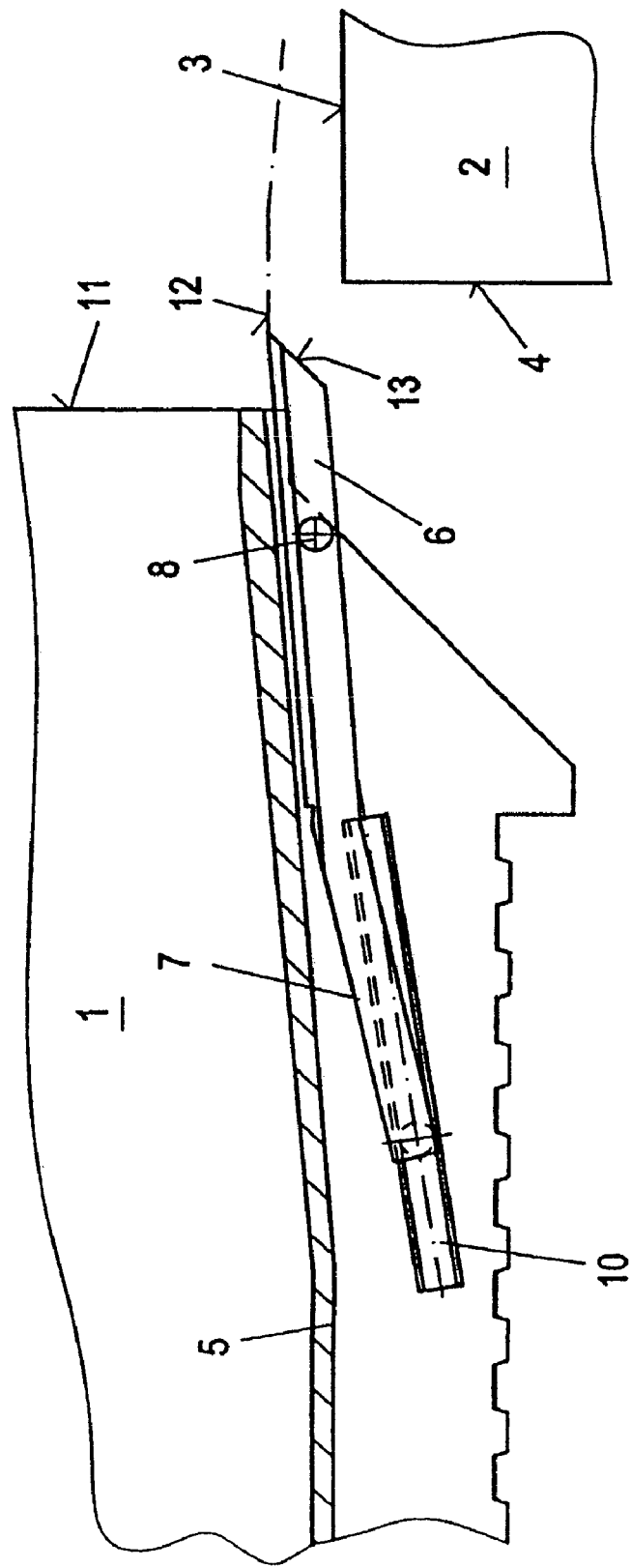
FIG. 2 shows the retractable step of FIG. 1 at a start of an extension motion.
Figure 3:
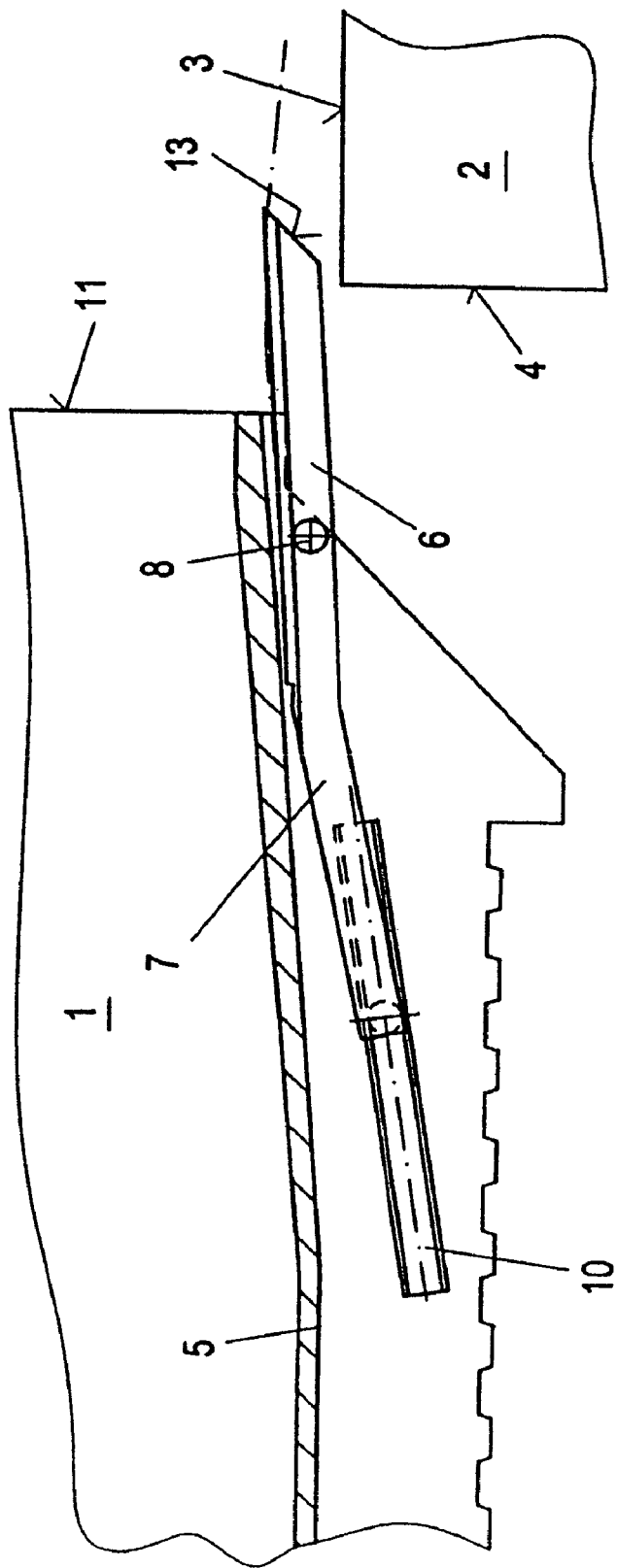
FIG. 3 shows the retractable step of FIG. 1 in a further extended position.
Figure 4:
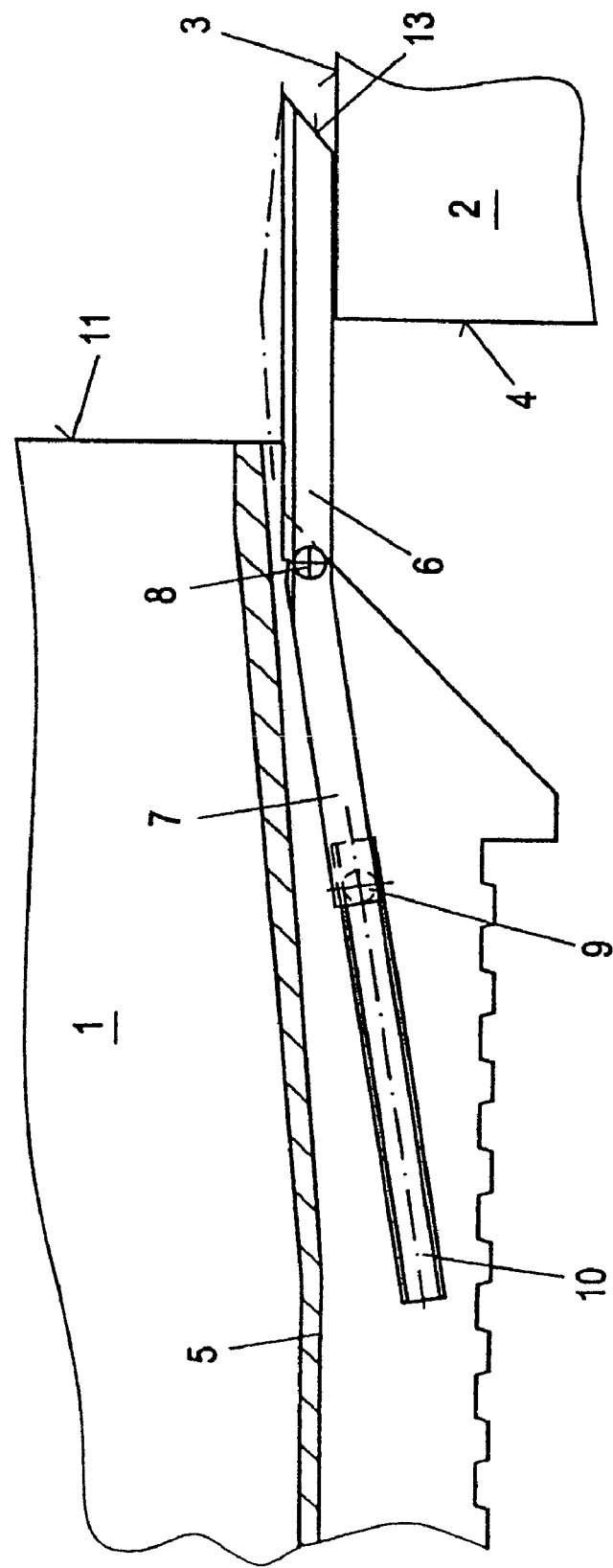
FIG. 4 shows the retractable step of FIG. 1 in a fully extended position.

FIG. 1 is a partial sectional view perpendicular to a longitudinal axis of a rail vehicle 1 and perpendicular to a longitudinal axis of a rail track (not shown). As can be seen from FIG. 1, between a side wall 11 of vehicle 1, that is the side wall 11 facing a platform 2, and an end wall 4 of the platform 2, there is a clearance or gap 20, which gap 20 is intended to be bridged by a retractable step 6. FIG. 1 shows a situation in which an underside 5 of the rail vehicle or car body 1 lies approximately level with a platform top edge 3, so that a conventional, horizontally extensible retractable step disposed beneath the car body 1 or its underside, floor construction 5 would bang against the end wall 4 of the platform 2.

The retractable step 6, according to the present invention comprises a treadable region 14 having lateral guides 15 in which there slides a roller 8 fixed to the car body 1. Retractable step 6 further comprises a nontreadable guide region 7 having a roller 9 which slides in a guide 10 fixed to the car body 1. According to the present disclosure, the guide 10 is not horizontal, but is oblique and/or curved, and may even be bent. Such a configuration enables an extension motion of a front edge 13 of the retractable step 6, which motion is indicated by an extension path 12, represented by the dash-dot line in FIG. 1. As can be seen from the extension curve path 12, the retractable step 6 makes its way, in an obliquely upwardly directed motion, to be above the platform top edge 3, and then, in an obliquely downwardly directed motion, proceeds onto, or just above, the top surface or top edge 3 of the platform 2.

This obliquely upward and downward motion is reinforced or made possible by the bent configuration of a transition area 19 between the treadable region 14, which, in an extended position, ends up in the gap 20 region, and the guide region 7, which corresponds to an upwardly convex shape. A choice of magnitude of the bent configuration or curvature of the retractable step 6 and a tilt and curvature, or bend angle, of the guide 10, makes it possible for a person skilled in the art to choose between a large number of configurations of the extension curve path 12.

The motion of the retractable step 6 is realized either by the guide region 7 being pushed or pulled from a side of the retractable step most distant from platform 2 in the direction of the platform 2 by a drive unit 30. Such a drive unit 30 may be a pneumatic drive, which may, for example, be in the form of a cylinder-piston unit and may be coupled to a retaining spring. The drive unit can also be realized by flexible elements such as a cable or chain. The roller 9 can also be driven directly by a motor and, when roller 9 is in the form of a gearwheel, roller 9 can move the guide region 7 back and forth along the guide 10, which in this embodiment corresponds to a rack rail.

In order not to harm obstacles, for example platforms of above-average height, equipment located next to the track, or waiting passengers, as the retractable step 6 is extended, the motional sequence of the retractable step 6 must be able to be monitored. In an embodiment of the present disclosure, sensors 16 are fitted to the retractable step 6 such that they promptly detect obstacles as noted above. As a result upon encountering obstacles, the motional sequence of the extending retractable step 6 is halted. Sensors 16 are integrated, in the form of movement sensors, in a region of the guide 10 and/or directly in a drive mechanism and register unwelcome deviations from a normal motional sequence during extension of the retractable step 6. Further embodiments dispose sensors 17, in the form of proximity or contact sensors, directly on the front edge 13 or on an underside 18 of the treadable region 14. Sensors 17 fitted to the underside 18 of the treadable region 14 may be used to adjust a clearance between the platform 2 and the treadable region 14 of the retractable step 6, insofar as such a clearance is envisaged, for example, in the case of uneven platforms.

A mechanical configuration of the retractable step 6, a mounting and guidance of the rollers 8, 9 and their dimensioning, and a fitting of the drive 30 does not differ from those of known retractable steps.

Although the present disclosure has been described and illustrated in detail, it is to be clearly understood that this is done by way of illustration and example only and is not to be taken by way of limitation. The scope of the present disclosure is to be limited only by the terms of the appended claims.

I claim:

1. A retractable step for a rail vehicle, comprising:
   a treadable region having lateral guides;
   a front edge;
   a guide region;
   a first roller disposed on the rail vehicle to receive the lateral guides for movement on the first roller;
   a second roller mounted on the retractable step and disposed in a guide coupled to the rail vehicle, the second roller moving and staying in the guide over substantially an entire length of the guide between a retracted position and an extended position of the retractable step, the guide having a configuration that is one or more of the following: oblique, curved and bent relative to an underside of the rail vehicle; and
   a transition area between the treadable region and the guide region, the transition area being configured to have one or more of a bend and a curvature and having an upwardly convex shape.

2. The retractable step as claimed in claim 1, wherein the treadable region includes a sensor.

3. The retractable step as claimed in claim 2, wherein the sensor is a proximity sensor.

4. The retractable step as claimed in claim 2, wherein the sensor is a movement sensor.

5. The retractable step as claimed in claim 2, wherein the sensor is a contact sensor.

6. The retractable step as claimed in claim 1, wherein the guide region is one of pushed and pulled along the guide in a direction toward a platform by a drive unit.

7. The retractable step as claimed in claim 1, wherein the guide region is moved along the guide in a direction toward a platform by the second roller.

8. The retractable step as claimed in claim 1, wherein the second roller is a gearwheel and the guide includes a rack rail.

9. The retractable step of claim 1, wherein the front edge includes a sensor.

10. The retractable step of claim 1, wherein the guide region includes a sensor.

11. The retractable step of claim 1, wherein the guide includes a sensor.

12. The retractable step of claim 6, wherein the drive unit includes a pneumatic drive.

13. The retractable step of claim 9, wherein the sensor is a proximity sensor.

14. The retractable step of claim 9, wherein the sensor is a movement sensor.

15. The retractable step of claim 9, wherein the sensor is a contact sensor.

16. The retractable step of claim 10, wherein the sensor is a proximity sensor.

17. The retractable step of claim 10, wherein the sensor is a movement sensor.

18. The retractable step of claim 10, wherein the sensor is a contact sensor.

19. The retractable step of claim 11, wherein the sensor is a proximity sensor.

* * * * *